(12) United States Patent
DeLuca et al.

(10) Patent No.: US 9,877,212 B1
(45) Date of Patent: Jan. 23, 2018

(54) CROWD SOURCING BEACON SETTING ADJUSTMENTS

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/345,606

(22) Filed: Nov. 8, 2016

(51) Int. Cl.
*H04W 24/04* (2009.01)
*H04W 4/00* (2009.01)
*H04L 29/08* (2006.01)

(52) U.S. Cl.
CPC ............. *H04W 24/04* (2013.01); *H04L 67/34* (2013.01); *H04W 4/008* (2013.01)

(58) Field of Classification Search
CPC ........................... H04W 4/008; H04W 40/244
See application file for complete search history.

(56) References Cited

U.S. PATENT DOCUMENTS

| 8,254,838 B2 | 8/2012 | Feldstein |
| 9,024,998 B2 | 5/2015 | Chu et al. |
| 2013/0176925 A1* | 7/2013 | Sampath ........... H04W 52/0209 370/311 |
| 2014/0191868 A1 | 7/2014 | Ortiz et al. |
| 2016/0315982 A1* | 10/2016 | Wallace ............. H04L 65/4076 |

OTHER PUBLICATIONS

Anonymous; Mobile Device Resource Conservation During Geo-Location Operations; IP.com Prior Art Database Technical Disclosure; IP.com No. IPCOM000231493D; Oct. 2, 2013; 18 pages.
Anonymous; A Facility Method to Impliment Short Distance Navigation; IP.com Prior Art Database Technical Disclosure; IP.com No. IPCOM000241424D; Apr. 25, 2015; 7 pages.
Anonymous; System and Method of Utilizing Wireless Beacons, Social Media and Smart Phones for Market Data and Research; IP.com Prior Art Database Technical Disclosure; IP.com No. IPCOM000246843D; Jul. 5, 2016; 7 pages.

* cited by examiner

*Primary Examiner* — Tuan H Nguyen
(74) *Attorney, Agent, or Firm* — Schmeiser, Olsen & Watts; John R. Pivnichny

(57) ABSTRACT

The present invention provides a method and system for configuring multiple beacons distributed in one or more physically uncoupled sites. A computing device sends a command to multiple portable communication devices to update, when a portable communication device is within range of a beacon, one or more parameters of selected beacons to be updated with data specific to each beacon. The command instructs for verification of a beacon update to be immediately sent to the computing device and in response to the verification, an instruction is sent from the computing device to the multiple portable communication devices to not update the a first beacon to which the beacon update pertains with the identified data specific to the first beacon.

18 Claims, 5 Drawing Sheets

| INTERVAL msec | TX POWER | TX RANGE | BATTERY LIFE |
|---|---|---|---|
| 100 | -20dBm | 3.0 m | 8 mo. |
| 400 | -20dBm | 3.0 m | 32 mo. |
| 800 | -20dBm | 3.0 m | 64 mo. |

CROWD SOURCING BEACON SETTING ADJUSTMENTS

TECHNICAL FIELD

The invention relates generally to the field of configuring wireless Bluetooth® Low Energy (BLE) beacons, and in particular to a method and system for managing and updating configuration settings of beacons by crowd sourcing using smart phones or other portable communication devices.

BACKGROUND

Beacons are used to share information with people, often in a retail shopping environment. For instance, beacons can be used in bars, restaurants, sandwich shops, etc. to provide customers with virtual menus, detailed product and service information, food source data, suggested wine pairings, food calorie information, etc. Beacons can be used to provide contextual information about products or other items, including analytics that may be helpful in decision-making for uses such as, but not limited to, admission ticket information, self-guided tours and educational excursions. Beacons can also be used to assist customer navigation throughout a mall or store. Beacons can be used to promote special sales, to initiate and tally feedback on products and shopping experiences, to provide shoppers with time-sensitive data, to sell current products and provide information on upcoming products, etc. Beacons can be used to provide all kinds of information such as for registration, seating, navigation, advertising by sponsors, networking, providing additional information about the event or upcoming events, etc.

Accordingly, there is a need for improved beacon configuration methods, systems and technology to efficiently and accurately update configuration data for beacons distributed at location in one or more physically uncoupled sites.

SUMMARY

The present invention provides a method, and associated computer system and computer program product, for configuring multiple beacons by a computing device sending a command to each portable communication device of multiple portable communication devices to update one or more parameters of each beacon of multiple beacons to be updated with identified data that is specific to each beacon, in response to a determination by each portable communication device of being within a wireless communication range of each beacon. The command instructs each portable communication device to immediately communicate each update of the one or more parameters of each beacon to the computing device. The multiple beacons are distributed in one or more physically uncoupled sites. The computing device receives from a first portable communication device of the multiple portable communications devices, a first communication expressing that the first portable communication device has updated the one or more parameters of a first beacon of the multiple beacons with the identified data specific to the first beacon. Immediately upon receiving the first communication, the first computing device sends an instruction to the multiple portable communication devices to not update the first beacon with the identified data specific to the first beacon. The above process continues until completion of the updates to each of the beacons that was scheduled to be updated.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

Figure 1:
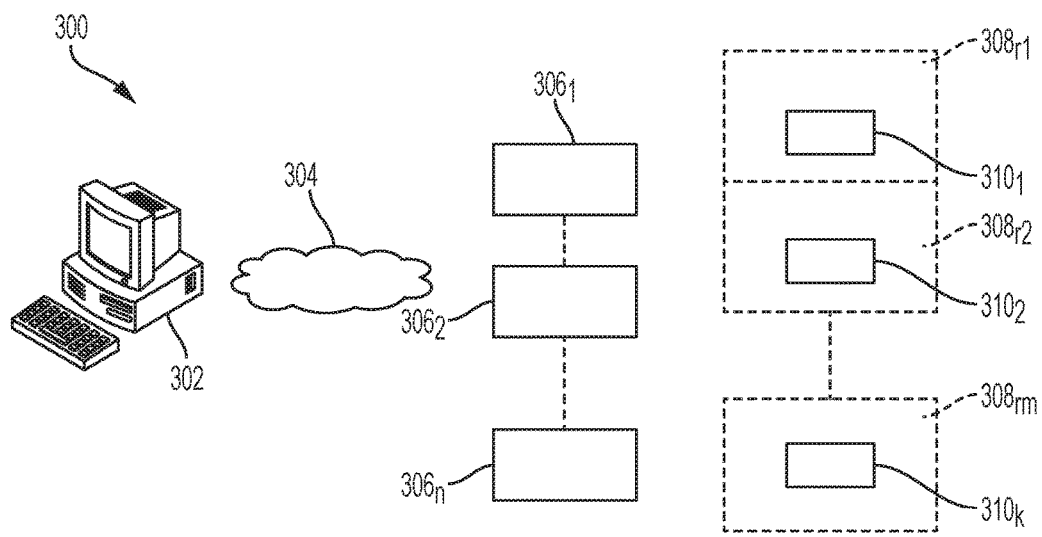
FIG. 1 is a diagram of a crowd sourcing system operating in accordance with embodiments of the present invention.

FIG. 1 is a diagram of a crowd sourcing system operating in accordance with the principles of the present invention. The crowd sourcing system in FIG. 1 includes a computing device 302, a wireless network 304, a plurality of portable communication devices $306_1, 306_2 \ldots 306_n$, and a plurality of beacons $310_1, 310_2 \ldots 310_k$ wherein each beacon 310 has a separate transmission range $308_{r1}, 308_{r2} \ldots 308_{rm}$, respectively. The transmission range for each beacon, such as $308_{r1}$ related to beacon $310_1$, is illustrated with dotted lines in a rectangular shape for convenience only. In fact the actual transmission range of a signal from beacon $310_1$ would more closely resemble a circle centered at beacon $310_1$ having a given radius of transmission. The beacons $310_1, 310_2 \ldots 310_k$ use micro-location technologies, such as Bluetooth® Low Energy (BLE) beacons which are becoming increasingly important to commercial venues such as retail stores, hospitals and sporting venues.

Various wireless beacons are available on the market, such as Apple Inc.'s iBeacon® and Google Inc.'s Eddystone®, as well as others. Management of large beacon deployments in venues is very difficult since BLE beacons do not connect to a Wi-Fi network, being so-called "dummy devices" which require a device interaction to configure the settings of each individual beacon. As one example, iBeacons are a class of Bluetooth® low energy devices that broadcast their location to nearby portable electronic devices, using a protocol standardized by Apple. The technology enables smartphones, tablets and other portable communication devices to perform actions when within range of a signal transmission from an iBeacon.

Bluetooth® technology, trademarked by Bluetooth Special Interest Groups (SIG), Inc., is a wireless technology standard for exchanging data over short distances using short-wavelength UHF radio waves in the frequency range of 2.4 to 2.485 GHz from fixed and mobile devices. Bluetooth technology is designed primarily for low-power consumption with a short range based on low-cost transceiver microchips in each device to facilitate audio and data distribution and wireless interconnection of mobile phones, computers, and other electronic devices. Bluetooth protocol is known in the art as a short range, e.g. 10 meter, frequency-hopping radio link between devices. Bluetooth enabled devices recognize other Bluetooth devices that are within range and then connect with those other Bluetooth devices, either automatically or at a user's discretion.

The BLE beacons 310 of FIG. 1 may be placed in locations throughout the store where user engagement would most likely be triggered. In contrast to other sensing hardware, beacons operate on small batteries (such as watch batteries) and thus beacons do not have a dependency on electrical power outlets. The beacons can be stuck to any location (e.g. with double sided tape), although there should be an awareness to potential obstructions since the beacon is sending out a radio signal which could potentially be blocked or reflected. Most beacons send their signals in all directions, but some vendors provide beacons with directional control.

Each BLE beacon 310 includes a Micro-Controller Unit (MCU), a BLE radio transmitter and receiver, an antenna and a power source. The BLE beacon broadcasts a signal throughout a given range, where the signal includes packets with identifying information, and each packet is called an Advertising Packet (AP). The APs generally include product information, pricing information, etc. which a client or customer may find useful while browsing through, for instance, a retail store where the beacons are located. The packet structure and the information broadcast by a beacon depend on the specific beacon protocol and the packets typically include fields of beacon configuration data.

A beacon 310 typically includes the following configuration parameters: UUID (universal unique identifier), a MAJOR and a MINOR. An UUID is a unique identifier which is used to individually identify a beacon or a group of beacons from other beacons. A Major is a number which is used to identify a group of beacons that share a UUID. In other words, a Major defines a property of the beacon signal to distinguish between different zones within a venue. A Minor is a number which is used to identify a specific beacon that shares both a UUID and a Major number. A Minor also defines a property of the beacon signal in order to further distinguish or sub-divide zones within a venue.

Identified data that is specific to each beacon 310 is referred to as beacon configuration data. The identified data includes parameters such as, but not limited to, the UUID number, a Major number, a Minor number, radio range of the beacon, beacon radio signal frequency information, Received Signal Strength Indicator (RSSI), beacon battery life information, information identifying the exact location of the beacon, time intervals between beacon transmissions, beacon power information, beacon date put into use, etc.

Beacons can be provided from their manufacturers with configuration data that is subject to modification by a user. For instance, each beacon UUID, Major number and Minor number can be changed by the user using an appropriate proprietary application or software development kit (SDK) along with well-known cloud technology.

In order to change configuration data of a beacon, such as a Major or Minor number, a device with the updated configuration data must enter within the Bluetooth transmission range of the beacon in order to allow transfer of the updated configuration data to the beacon. It is a tedious task for any person, such as a user, manager or system administrator, to update a large number of beacons, for instance in a retail store having a multitude of beacons distributed throughout various floors, rooms and departments.

In the system of FIG. 1, the computing device 302 sends a command by way of wireless communication via Wi-Fi, the Internet, a wireless LAN (local area network), a wireless WAN wireless transmission, or the like to a multitude or plurality of portable communication devices 306; e.g., using cloud technology, which is well known as the practice of using a network of remote servers/computers hosted on the Internet to store, manage, and process data, rather than by using a hard-wired local server or a personal computer. A wireless network or cloud 304 is used to transfer data between the computing device 302 and the plurality of portable communication devices $306_1$, $306_2$ ... $306_n$. The portable communication devices $306_1$, $306_2$ ... $306_n$ are individually held by users, customers or others who move throughout a venue such as a retail store where beacons $310_1$, $310_2$ ... $310_k$ are positioned or located and whereby the beacons have transmission ranges, respectfully, of $308_{r1}$, $308_{r2}$ ... $308_{rm}$.

The computing device 302, used to implement the methods of the present invention, can be any known computer device which is connected to a wireless network. For instance, the computing device 302 could be a desktop computer, server, laptop computer, computer tablet, smart phone, mobile computer or any other wireless computerized device.

Figure 2:
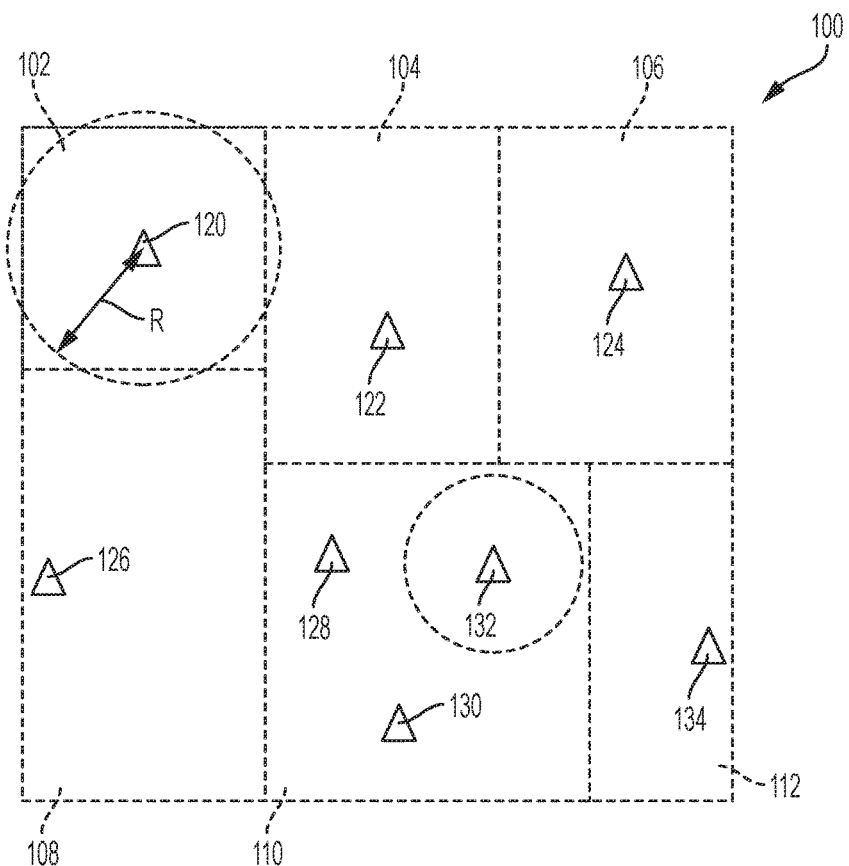
FIG. 2 is an exemplary floor plan of a retail store using beacon technology and illustrating the implementation of an embodiment of the inventive method for managing and updating configuration settings of beacons by crowd sourcing using smart phones or other portable communication devices, in accordance with embodiments of the present invention.

FIG. 2 is an exemplary floor plan of a retail store 100 using beacon technology and illustrating the implementation of an embodiment of the inventive method for managing and updating configuration settings of beacons by crowd sourcing using smart phones or other portable communication devices, in accordance with embodiments of the present invention. The exemplary floor plan of the retail store 100 illustrates the technology for updating beacon configuration settings in accordance with the invention. Store 100 is a retail grocery store having an open floor plan where all departments and areas are located in one large room separated only by aisles and shelves of products. The store 100 has a frozen foods area 102, a canned goods are 104, a dairy area 106, an area 108 for cleaning items, a produce area 110 having fresh fruits and vegetables, and a bakery area 112. A beacon integration system has been installed in the store to provide customers with information about products, sales, special events, etc. as the customers walk throughout the store.

One such commercially available beacon integration system is IBM® Presence Insights® which consists of hardware and software systems, and is available as a Cloud Service. The system provides a platform that enables venues (such as store 100) associated with public spaces, healthcare, travel, stadiums, retail stores, and transportation businesses to extend customer service and support with any type of computerized wireless customer mobile devices such as smart phones, tablets, portable computers, etc. Although Presence Insights is used for the embodiments herein, other beacon integration systems could also be used.

The beacon integration system platform leverages inputs from multiple sources of sensory technology, combining them to determine accurate locations for devices within the venue. The store beacons include beacon sensors which provide beacon location information. The beacons are intentionally conspicuous devices designed to attract attention to specific locations. The goal of beacon use in the store 100 is to track user movements and locations, and to alert the user by triggering actions in the application of the mobile user device.

The beacon integration system of store 100 is used to detect and gather real-time information about mobile devices, such as portable communication devices 306$_1$, 306$_2$ . . . 306$_n$ shown in FIG. 1. This information is used to monitor presence and track movement of mobile devices in a defined space or region. A software application, i.e. a "mobile app", is loaded onto a customer's smart phone, tablet or other portable computing device that has wireless capability. Based on the detection of a mobile user device in proximity to a beacon, business logic can trigger a push notification to the user. That notification can be anything from a simple message to a coupon.

The mobile app could also be loaded onto mobile devices provided to customers by the store 100 when the customers enter the store, and returned upon exit.

The beacon integration system platform supports various sensing technologies associated with radio communication protocols, such as Wi-Fi 802.11 networks and Bluetooth BLE beacons. An in-store customer experience will use intelligent location-based technology for marketing promotions and to engage customers/patrons using mobile devices in near real-time to influence and increase sales.

Both Wi-Fi proximity sensors that provide basic mobile device detection, and Bluetooth devices are supported by the exemplary beacon integration system which could support networks of Wi-Fi access points, referred to as Location Service Provider (LSP) systems, Bluetooth open standard protocols, or various proprietary beacon protocol networks.

The beacon integration system can also provide data for businesses to adjust associate and staff coverage based upon patron traffic. Mobile user devices, i.e. portable communication devices, communicate through radio signals using various protocols such as Bluetooth BLE, Wi-Fi 802.11 2.4 GHz and 5 GHz, and other radio communication protocols. When a mobile user device is detected using one of the supported protocols, a Globally Unique Identifier (GUID) is assigned for the device whereby the GUID can be the MAC address for the device.

Depending on the selected sensor hardware, there are two potential architectures of a beacon integration system for deployment within a venue: "Independent sensor system" architectures and "Location Service Provider (LSP)" architectures. Different sensors, whether beacons or Wi-Fi, fall into one or both categories. The quality of the device location data differs when received from a Location Service Provider versus information received from an Independent Sensor System. Location service providers use filtering, noise reduction algorithms, and triangulation or trilateration algorithms that convert radio signal values with a Received Signal Strength Indicator (RSSI) into relative coordinates. The RSSI defines the strength of a detected beacon signal. Trilateration is a known technique used in surveying and mapmaking that uses a tellurometer for measuring the sides of a network of triangles. Triangulation is also a known technique for the tracing and measurement of a series or network of triangles in order to determine the distances and relative positions of points spread over a territory or region, especially by measuring the length of one side of each triangle and deducing its angles and the length of the other two sides by observation from this baseline.

In an Independent Sensor System (ISS) architecture the sensors, which are usually beacons, simply broadcast their signals and require the beacon integration system SDK on a mobile application to listen for these signals and report them to the beacon integration system server. There is no third party aggregation server involved, so the location coordinates of a mobile device are usually assumed to be the location coordinates of the sensor that detected it. Fine-grained location determination is currently not possible with a single independent sensor due to hardware limitations. Some sensor payloads may contain accuracy attributes, but these types of metrics should be used very carefully because of the inherent inaccuracies in location hardware systems.

ISS architectures were previously referred to as "open architecture" systems. However, the phrase "open architecture" more accurately refers to any sensor system that uses open standards and protocols, such as the iBeacon protocol, supported by the beacon integration system SDK to send location data directly to the beacon integration system connectors. The term "closed architecture" generally refers to a system that uses proprietary communication protocols, a vendor-specific SDK, and some type of control or aggregation server. Frequently a "closed architecture" system can provide specific location coordinates while taking advantage of internal algorithms associated with the aggregation of location data form multiple sensors.

In a Location Service Provider System (LSPS) architecture, there is a separate control server involved in the sensor deployment, as well as a separate vendor-specific mobile SDK. The mobile application uses the vendor-specific SDK to send beacon data to a control server. This control server aggregates the data and can manipulate the data in a variety of ways, such as smoothing and filtering the data, and possibly employing triangulation or trilateration algorithms to determine relative device coordinates based on radio signal direction and strength. This control server must be configured to then send the data to the beacon integration system server. The data format may be completely different at that point. For example, the control server may be able to determine the exact position of the detected device and send the X,Y coordinates to the beacon integration system.

Location service provider architectures have also been referred to as "closed systems" that typically use proprietary communication protocols along with a third party SDK. These closed systems can resolve a mobile user device location to specific X,Y coordinates on a map, which allows for finer grained location-based actions and analytics.

A user, via the mobile user device, is tracked as he or she moves through the venue and all personally identifiable information (PII) including the MAC address or GUID is encrypted by using a public key that is provided by the vendor to ensure that the user/customer data is secure. As the mobile user device moves through the venue, notifications can be triggered and sent to enable other back-office systems to take action.

In FIG. 2 beacons 120, 122, 124, 126, 128, 130, 132, 134 have been positioned throughout the store 100, whereby each beacon transmits a Bluetooth signal having a predetermined range in such as manner as to provide complete coverage of the retail shopping areas. Other types of short range wireless transmission to and from a beacon could be used, although this example uses Bluetooth.

Beacon 120 is shown to have a transmission radius R which is predetermined according the manufacturer's specifications for the particular beacon. For instance the maximum radius could be 10.0 meters. The beacon 120 is positioned in the frozen food area 102 in a location where all products and floor space within the frozen food area 102 will be within the range or radius R of the beacon 120.

Beacon 122 is positioned within the canned goods area 104, beacon 124 is positioned within the dairy area 106, beacon 126 is positioned within the cleaning goods area 108, beacons 128, 130 and 132 are positioned within the fresh produce area 110, and the beacon 134 is positioned within the bakery area 112. Of course, more or less beacons could be positioned and activated throughout the store 100 if desired. The fresh produce area 110 includes a beacon 128 in the fresh fruit section, a beacon 130 in the fresh vegetable section, and a beacon 132 in the organic fruit and vegetable section.

Each beacon is shipped from the factory with default configuration values or settings which can vary from vendor to vendor. Typical beacon configuration settings include, but are not limited to: the UUID number, the Major number, the Minor number, transmission power of the beacon, transmission intervals of the beacon's signal, transmission range of the beacon and estimated battery life. One way to change these configuration settings is by an individual to walk around the store 100 to get within the range of each individual beacon in order to reset or change the configuration settings from his portable communication device.

In most large retail stores, there will be times when a large crowd of customers will be browsing throughout the store. When the customers are each provided with the mobile app for their personal mobile devices, then product and other information will be provided to the customers on their personal mobile devices (i.e. portable communication devices) while browsing around the store within the range of various beacons.

A system administrator, such as a store employee or manager, can submit changes to beacon configuration settings for one or more of the beacons 120, 122, 124, 126, 128, 130, 132, 134 distributed throughout the store 100. The configuration changes can be implemented from a computer device such as computing device 302 either by the administrator/user, or the changes could be programmed to occur automatically at a specific time and date.

The beacon integration system can also provide reports to analyze mobile user device movement inside the store 100, specifically tracking movement behavior of users with portable communication devices related to defined sites and zone regions. The reports enable sophisticated analysis of the site's customer data, such as movement patterns, site traffic, and owner preferences. Reports can include details, such as the following: the average number of users in a zone at any specified time; the average number of users in the site at any specified time; how long the users stay in a particular zone; how long the users remain in the site; how many users enter the site, or a particular zone on any specified date; and the number of new users, versus previous users, that enter the site on any particular day or time.

A portable communication device may sometimes detect several beacons at the same time. For instance in FIG. 2, a mobile device of a customer walking through the fresh produce area 110 may simultaneously detect beacons 128, 130 and 132 if the mobile device falls within the transmission range or radius of each of the beacons 128, 130 and 132.

In the current example, the initial beacon system in store 100 used default beacon configuration values and the system did not include beacons 130 and 132, which were added at a later time. A change in the configuration data of beacons 128, 130 and 132 is desired. Thus, the configuration data being identified data that is specific to each beacon, is changed by the computing device 302 of FIG. 1. This configuration data could be manually changed by an user, or could be automatically programmed to occur at a specific time and date. In this example, the default values of beacons 128, 130, 132 are modified so that beacon 128 will change the transmission radius/range of beacon 128 and only be detected in the fresh fruit area to disperse data about fresh fruit, beacon 130 will have a transmission radius/range set to only be detected in the fresh vegetables area to disperse data about fresh vegetables, and beacon 132 will have a transmission radius/range set to only be detected in the organic fruits and vegetables area to disperse data about organic fruits and vegetables. In changing the configuration settings of beacon 128, and adding the new beacons 130, 132 with modified configuration data for each new beacon, the computing device 302 will modify the RSSI, the transmission power, range and radius of beacon 128.

The user can change the transmission range of beacon 128, for instance from 10.0 meters to 5.0 meters, which would be done by cutting the transmission power or RSSI of beacon 128 to correspond to a 5.0 meter radius. The change is saved on the computing device 302 and sent via wireless service to each mobile user device 306. Thus when any one customer/user of the crowd of customers/users gets within range of beacon 128, the user's portable communication device would communicate with the beacon by Bluetooth communication to reconfigure the transmission power and range settings of the beacon 128 to the new values. The Bluetooth AP packet would also be modified for beacon 128 as well as beacons 130, 132 to present data corresponding to the specific product target groups of beacons 128, 130, and 132. Once the beacon 128 has updated the configuration settings of beacon 128 with the new values, the beacon 128 via Bluetooth will send a confirmation notification to the user's portable communication device which, in turn, will forward the confirmation to the computing device 302 via the wireless service.

Updating the configuration settings of beacons using the above approach will save considerable time and effort by utilizing crowd sourcing to implement the updates. This technique is especially useful when there are numerous beacons that require configuration setting updates, such as for large stores and venues which would otherwise require someone to walk throughout the store within range of each beacon in order to update all of the beacons.

One configuration value that could be updated using the method described herein is the UUID number which will correspond to a specific site location. In other words for a chain of stores, each separate store located at a different physical location corresponds to a specific site location. Hence multiple beacons can be distributed in one or more physically uncoupled sites, meaning that the multiple beacons could all be all located at one site, i.e. one physical store location, or the multiple beacons could be located at multiple sites or physical store locations.

The Major and Minor configuration setting values of the beacons can also be changed using the method described herein. Turning again to FIG. 2, the grocery store 100 could assign a Major value/number=1 to be associated with the overall fruit and vegetable area that was previously described. Different Minor values could be assigned to each of the sub-groups or sub-areas within the fruit and vegetable department. For instance, beacons 128, 130 and 132 could each be assigned the store UUID=20 whereby the Major value=7 which designates the fruit and vegetable department. The beacon 128 could be assigned the Minor value=1 designating fresh fruit, the beacon 130 could be assigned the Minor value=2 designating fresh vegetables, and the beacon 132 could be assigned the Minor value=3 designating organic fruits and vegetables.

Figure 3A:
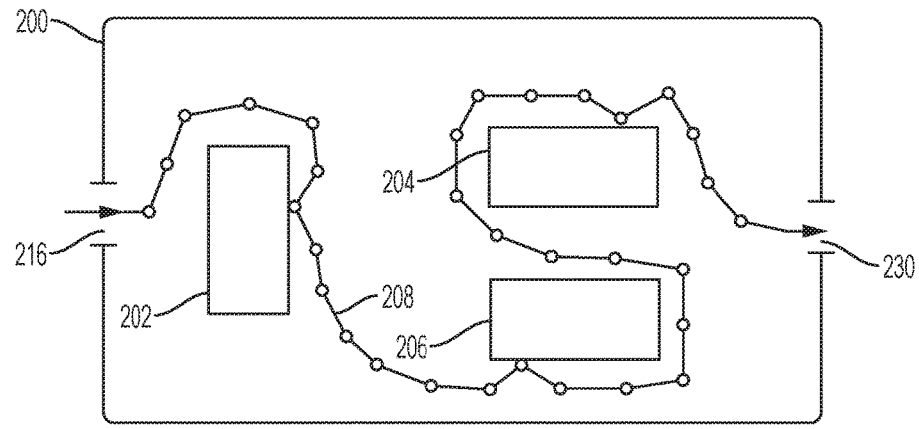
FIGS. 3A, 3B and 3C are floor plan representations illustrating various beacon configurations with regards to transmission power, transmission intervals, transmission range and expected battery life of beacons, in accordance with embodiments of the present invention.
Figure 3B:
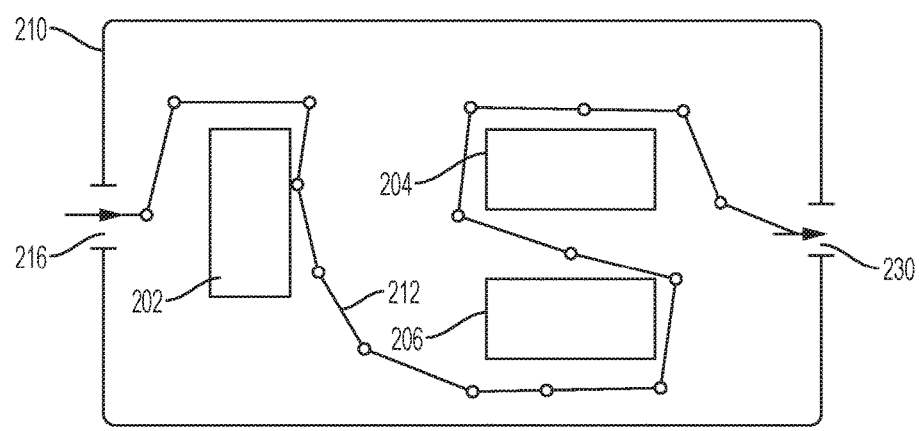
Figure 3C:
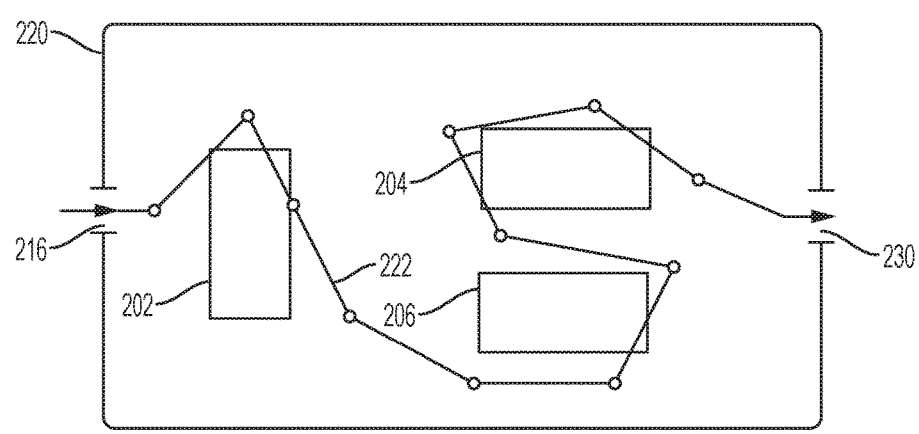

FIGS. 3A, 3B and 3C are floor plan representations illustrating various beacon configurations with regards to transmission power, transmission intervals, transmission range and expected battery life of beacons, in accordance with embodiments of the present invention. FIGS. 3A, 3B and 3C illustrate information that is gathered by beacons that are set to different transmission intervals at a given transmission power level of −20.0 dBm and a given transmission range of 3.0 meters. The transmitted dBm power level of −20.0 dBm for each beacon is the power ratio in decibels (dB) of the measured power referenced to one milliwatt (mW). The transmitted range for each beacon in this example is 3.0 meters. Each user enters the retail store area at entrance 216 and carries a portable communication device loaded with the mobile app to detect beacons via Bluetooth, and also equipped with wireless capability to communicate with the computing device 302. The floor plans 200, 210, 220 are identical with each floor plan including an entrance 216, an exit 230, and product shelving areas 202, 204, 206. The floor plans 200, 210, 220 depict customer paths 208, 212 and 222, respectively, wherein the dots on each path denote discrete beacon transmissions propagated from the beacons at respective discrete times. For illustrative purposes, the customer is assumed to move along each customer path 208, 212, 222 in FIG. 3B at a constant velocity, so that the time interval between successive beacon transmissions is proportional to the distance between successive dots on each path in FIG. 3B. In general, the customer may move along the customer path at a constant velocity or at a variable velocity.

Figures 4, 5:
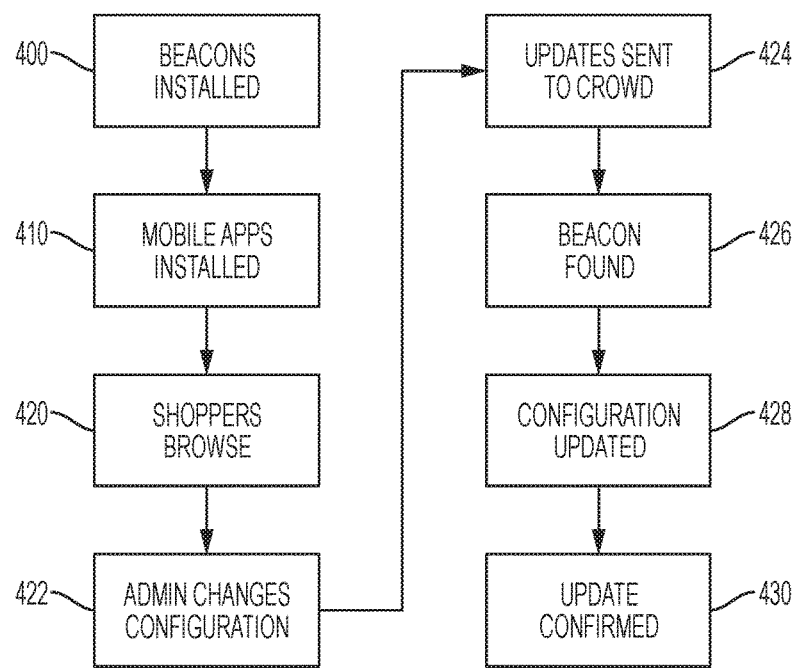
FIG. 4 is a chart comparing the FIG. 3A, 3B, 3C beacon transmission intervals with expected battery life, in accordance with embodiments of the present invention.
FIG. 5 is a flowchart diagram of a method for managing and updating configuration settings of beacons by crowd sourcing using smart phones or other portable communication devices, in accordance with embodiments of the present invention.

FIG. 4 is a chart comparing the FIG. 3A, 3B, 3C beacon transmission intervals with expected battery life, in accordance with embodiments of the present invention. FIG. 4 relates to FIGS. 3A, 3B and 3C as a chart that shows the relationship between beacon battery life and beacon transmission intervals given a set transmission power and range. The battery life of the beacons can be extended by configuring the beacons to use a larger transmission interval between transmitted radio signals. However, the tradeoff for increasing battery life is having less accurate data on the movement and activities of the customer walking through the store since communication intervals are more spaced apart when battery life is extended. The most frequent beacon transmission intervals of 100 milliseconds polled by the customer paths of FIG. 3A highlight frequent movements of the customer, for instance in stopping to look at shelf items at each of the three shelves 202, 204 and 206. When the beacon transmission interval is changed to 400 milliseconds as shown by the customer paths of FIG. 3B, the customer movements are less accurately polled, and when the least frequent beacon transmission interval of 800 milliseconds is polled by the customer paths of FIG. 3C, even less customer movement data is available.

FIG. 5 is a flowchart diagram of a method for managing and updating configuration of beacons by crowd sourcing or other portable communication devices, in accordance with the embodiments of the present invention. For instance, a store owner would purchase and install beacons according to step 400 and positioned them throughout the store/venue, such as shown in the exemplary floor plan of FIG. 2, along with a beacon integration system as previously described. In step 410, mobile applications are installed onto customers' portable communication devices which allows the mobile devices to communicate with both the beacons and a computing device as previously described. In step 420, shoppers are browsing throughout the store and receiving product data from nearby beacons on their mobile devices.

In step 422, a user such as a store manager, employee or system administrator, changes the configuration settings for one or more of the beacons located around the store. The changes could be programmed to occur automatically, or they could be done manually by the user from a computing device such as a desktop computer, server, laptop computer, smart phone or other computerized wireless device. The updates are communicated in step 424 from the computing device over a wireless network to the portable communication devices of the crowd of users who are browsing the store. When a user's portable communication device comes within transmission range of a beacon in step 426, the portable communication device decides whether there is updated configuration data to pass to the beacon. If so, then the configuration data for that particular beacon is transferred via Bluetooth from the portable communication device to the beacon and updated in step 428. Once the update has occurred, the beacon sends a confirmation to the user's portable communication device which in turn sends the confirmation notification to the wireless computing device in step 430.

Figure 6:
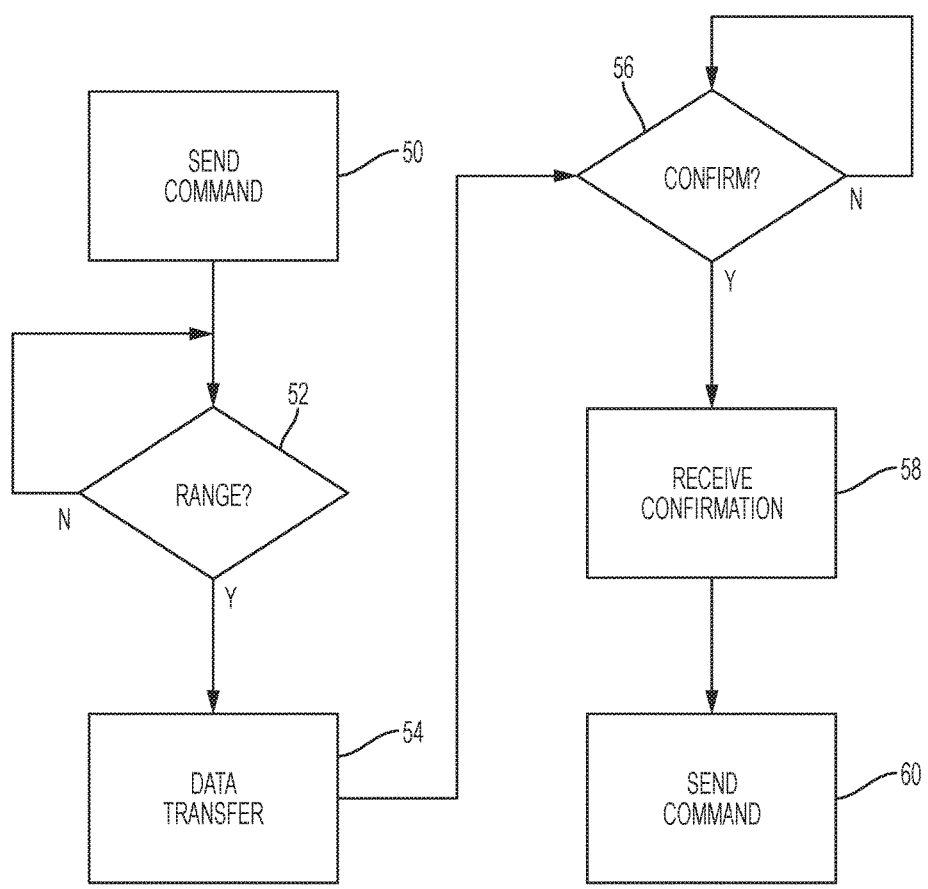
FIG. 6 is a flowchart diagram of another method for managing and updating configuration settings of beacons by crowd sourcing using smart phones or other portable communication devices, in accordance with embodiments of the present invention.

FIG. 6 is a flow chart diagram of another method for managing and updating configuration settings of beacons by crowd sourcing using smart phones or other portable communication devices, in accordance with the embodiments of the present invention. The flow chart includes steps 50-60.

Step 50 sends a command, via wireless communications by a computing device, to each portable communication device of multiple portable communication devices of users to update one or more parameters of each beacon of multiple beacons positioned throughout a site with identified data that is specific to each beacon. The action of step 50 is followed by the decision of step 52 by each portable communication device in determining whether each portable communication device is currently within a wireless communication transmission range of a particular beacon for which an update is commanded. The command instructs each portable communication device to immediately communicate each update of the one or more parameters, e.g. configuration data, of each beacon, to the computing device. The multiple beacons are distributed in one or more physically uncoupled sites. If a portable communication device is within the transmission range of a beacon to be updated in step 52, then the method moves to step 54. Otherwise if the portable communication device is not within the transmission range of a beacon to be updated, then the portable communication device will continue to search for a beacon transmission signal as the user moves throughout a venue.

In step 54 when a beacon (e.g., the first beacon) to be updated is detected then the updated configuration data, which could be referred to as identified data of one or more parameters of configuration data specific to the detected first beacon, is transferred from the portable communication device to the first beacon via Bluetooth signals. Step 56 determines whether the data transfer update has occurred.

Once the portable communication device receives a confirmation notification from the first beacon that the update has occurred, then the method moves to step 58. Otherwise, the portable communication device continues to poll the first beacon to determine whether an update has occurred.

In step 58 the computing device receives a first communication from the portable communication device that the (e.g., first) communication device has updated the one or more parameters of the first beacon of the multiple beacons with the identified data specific to the first beacon. In response to the first communication from the portable communication device, in step 60 the computing device immediately sends an instruction to the multiple portable communication devices to not update the first beacon with the identified data specific to the first beacon.

The method will continue until the updates are completed for each of the beacons so scheduled. For instance when a portable communication device is within range of a second beacon for updating, the same steps as described above will apply. The second beacon will be updated, a confirmation will be sent from the updated second beacon, the portable communication device will send a confirmation to the computing device which in turn will immediately send an instruction to the multiple portable communication devices to not update the second beacon with the identified data specific to the second beacon.

Although a single portable communication device could update multiple beacons, a crowd of users having multiple portable communication devices is more efficient in effectuating multiple updates.

Figure 7:
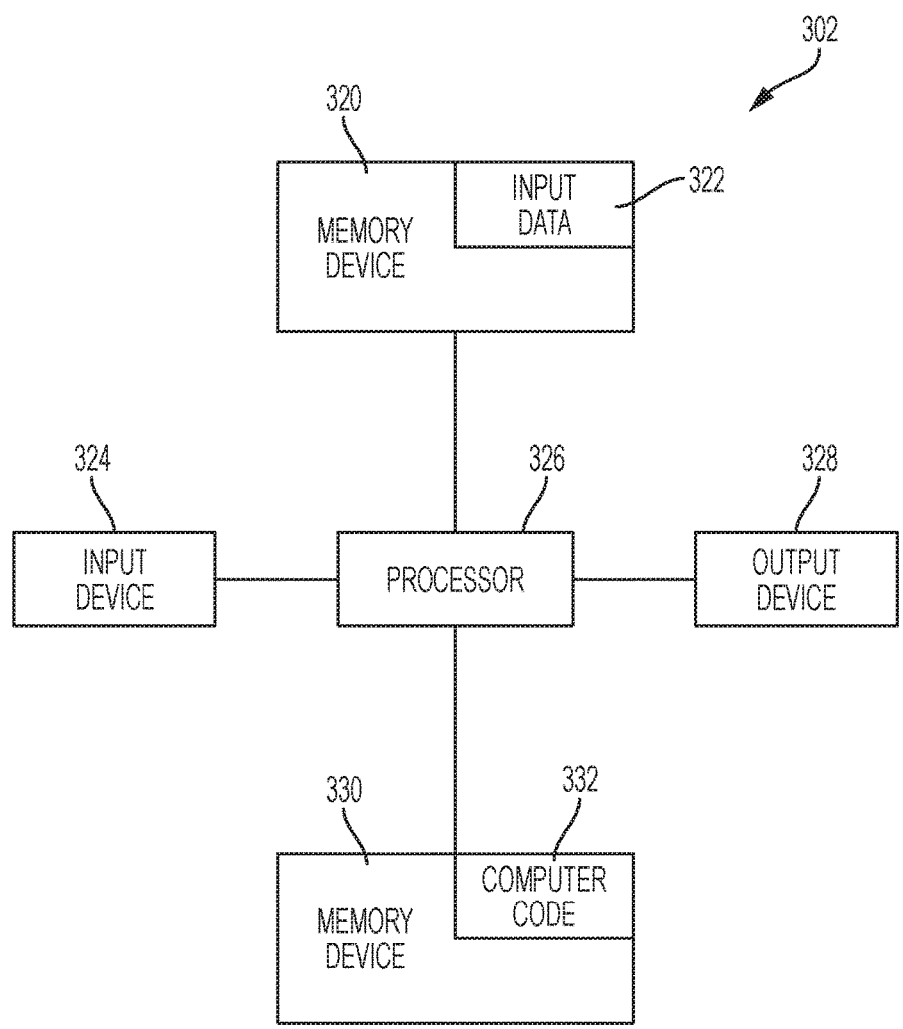
FIG. 7 illustrates an embodiment of the computing device of FIG. 1 used for implementing the methods of the present invention.

FIG. 7 illustrates an embodiment of the computing device 302 of FIG. 1 used for implementing the methods of the present invention. The computing device 302 includes a processor 326, an input device 324 coupled to the processor 326, an output device 328 coupled to the processor 326, and memory devices 320 and 330 each coupled to the processor 326. The input device 324 may be, inter alia, a keyboard, a mouse, etc. The output device 328 may be, inter alia, a printer, a plotter, a computer screen, a magnetic tape, a removable hard disk, a floppy disk, etc. The memory devices 320 and 330 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 330 includes a computer code 332 which is a computer program that includes computer-executable instructions. The computer code 332 includes software or program instructions that may implement an algorithm for implementing methods of the present invention. The processor 326 executes the computer code 332. The memory device 320 includes input data 322. The input data 322 includes input required by the computer code 332. The output device 328 displays output from the computer code 332. Either or both memory devices 320 and 330 (or one or more additional memory devices not shown) may be used as a computer usable storage medium (or program storage device) having a computer readable program embodied therein and/or having other data stored therein, wherein the computer readable program includes the computer code 332. Generally, a computer program product (or, alternatively, an article of manufacture) of the computer system/device 302 may include the computer usable storage medium (or said program storage device). The processor 326 may represent one or more processors. The memory device 320 and/or the memory device 330 may represent one or more computer readable hardware storage devices and/or one or more memories.

The present invention as described herein discloses a process for supporting, deploying and/or integrating computer infrastructure, integrating, hosting, maintaining, and deploying computer-readable code into the computer system 302, wherein the code in combination with the computer system 302 is capable of implementing the methods of the present invention.

While FIG. 7 shows the computer system/device 302 as a particular configuration of hardware and software, any configuration of hardware and software, as would be known to a person of ordinary skill in the art, may be utilized for the purposes stated supra in conjunction with the particular computer system 302 of FIG. 1. For example, the memory devices 320 and 330 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for configuring multiple beacons, said method comprising:
   commanding, by a computing device, each portable communication device of multiple portable communication devices to update one or more parameters of each beacon of multiple beacons with identified data that is specific to each beacon, in response to a determination by each portable communication device of being within a wireless communication range of each beacon;
   receiving, by the computing device from a first portable communication device of the multiple portable communications devices, a first communication expressing that the first communication device has updated the one or more parameters of a first beacon of the multiple beacons with the identified data specific to the first beacon; and
   receiving, by the first portable communication device, from the first beacon a notification that the first beacon has completed the update of the one or more parameters of the first beacon with the identified data specific to the first beacon prior to the computing device receiving the first communication.

2. The method of claim 1, wherein commanding further comprises instructing each portable communication device to immediately communicate each update of the one or more parameters of each beacon to the computing device.

3. The method of claim 1, wherein the multiple beacons are distributed in one or more physically uncoupled sites.

4. The method of claim 1, wherein in response to receiving the first communication said first computing device instructs the multiple portable communication devices to not update the first beacon with the identified data specific to the first beacon.

5. The method of claim 1, further comprising:
   receiving, by the computing device from a second portable communication device of the multiple portable communications devices, a second communication expressing that the second communication device has updated the one or more parameters of a second beacon of the multiple beacons with the identified data specific to the second beacon and in response, said computing device instructing the multiple portable communication devices to not update the second beacon with the identified data specific to the second beacon, wherein the first beacon and the second beacon are different beacons.

6. The method of claim 5, wherein the first portable communication device and the second portable communication device are a same portable communication device.

7. The method of claim 5, wherein the first portable communication device and the second portable communication device are different portable communication devices.

8. The method of claim 5, wherein the first beacon and second beacon are positioned at different locations in a same site of the one or more sites.

9. The method of claim 5, wherein the first beacon and second beacon are positioned at different locations in different sites of the one or more sites.

10. The method of claim 1, wherein the computing device and the multiple portable communication devices communicate over a wireless network, and the multiple portable communication devices communicate with the multiple beacons via Bluetooth.

11. A system, comprising a computing device, said computing device comprising one or more processors, one or more memories, and one or more computer readable hardware storage devices, said one or more hardware storage devices containing program code executable by the one or more processors via the one or more memories to implement a method for configuring multiple beacons, said method comprising:

commanding, by a computing device, each portable communication device of multiple portable communication devices to update one or more parameters of each beacon of multiple beacons with identified data that is specific to each beacon, in response to a determination by each portable communication device of being within a wireless communication range of each beacon;

receiving, by the computing device from a first portable communication device of the multiple portable communications devices, a first communication expressing that the first communication device has updated the one or more parameters of a first beacon of the multiple beacons with the identified data specific to the first beacon; and receiving, by the first portable communication device, from the first beacon a notification that the first beacon has completed the update of the one or more parameters of the first beacon with the identified data specific to the first beacon prior to the computing device receiving the first communication.

12. The system of claim 11 further comprising the method being implemented on the system wherein commanding further comprises instructing each portable communication device to immediately communicate each update of the one or more parameters of each beacon to the computing device.

13. The system of claim 11 further comprising the method being implemented on the system wherein the multiple beacons are distributed in one or more physically uncoupled sites.

14. The system of claim 11 further comprising the method being implemented on the system by:

receiving, by the computing device from a second portable communication device of the multiple portable communications devices, a second communication expressing that the second communication device has updated the one or more parameters of a second beacon of the multiple beacons with the identified data specific to the second beacon and in response, said computing device instructing the multiple portable communication devices to not update the second beacon with the identified data specific to the second beacon, wherein the first beacon and the second beacon are different beacons.

15. The system of claim 11, wherein the first beacon and the second beacon are positioned at different locations in a same site of the one or more sites.

16. A computer program product, comprising one or more computer readable hardware storage devices having computer readable program code stored therein, said program code containing instructions executable by a computing device to implement a method for configuring multiple beacons, said method comprising:

commanding, by the computing device, each portable communication device of multiple portable communication devices to update one or more parameters of each beacon of multiple beacons with identified data that is specific to each beacon, in response to a determination by each portable communication device of being within a wireless communication range of each beacon;

receiving, by the computing device from a first portable communication device of the multiple portable communications devices, a first communication expressing that the first communication device has updated the one or more parameters of a first beacon of the multiple beacons with the identified data specific to the first beacon; and receiving, by the first portable communication device, from the first beacon a notification that the first beacon has completed the update of the one or more parameters of the first beacon with the identified data specific to the first beacon prior to the computing device receiving the first communication.

17. The computer program product of claim 16, wherein the method further comprises:

receiving, by the computing device from a second portable communication device of the multiple portable communications devices, a second communication expressing that the second communication device has updated the one or more parameters of a second beacon of the multiple beacons with the identified data specific to the second beacon and in response, said computing device instructing the multiple portable communication devices to not update the second beacon with the identified data specific to the second beacon, wherein the first beacon and the second beacon are different beacons.

18. The computer program product of claim 16, wherein in response to receiving the first communication said first computing device instructs the multiple portable communication devices to not update the first beacon with the identified data specific to the first beacon.

* * * * *